March 25, 1958 P. P. GOBBERDIEL 2,827,803
DIFFERENTIAL GEARING
Filed Feb. 29, 1956 4 Sheets-Sheet 2
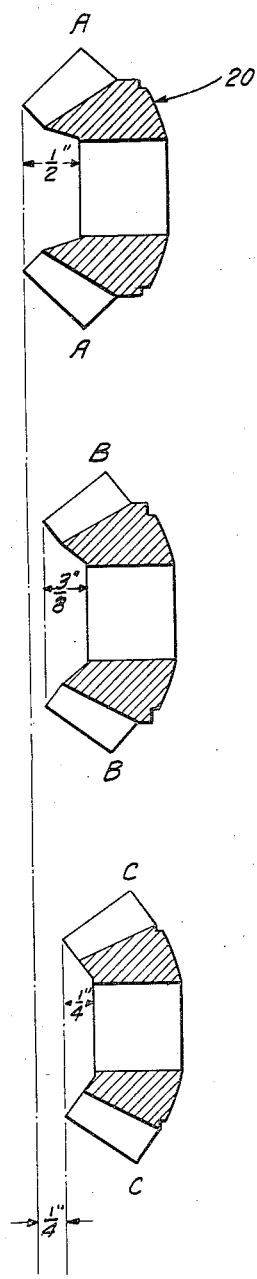
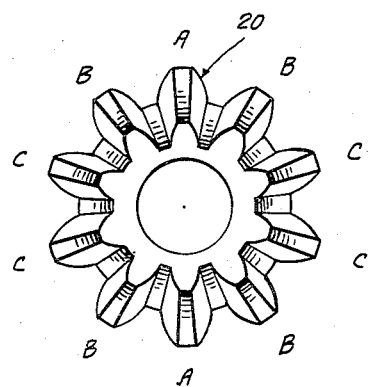
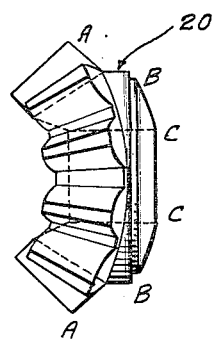
INVENTOR.
PETER PAUL GOBBERDIEL
BY
Harry H. Hitzeman
ATTORNEY.

FIG. 5.
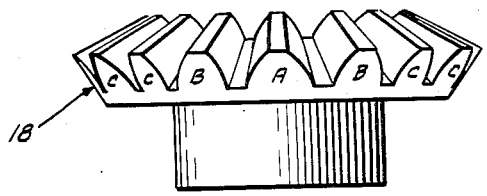
FIG. 7.
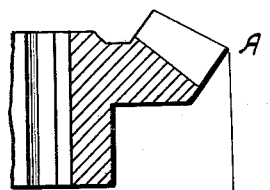
FIG. 8.
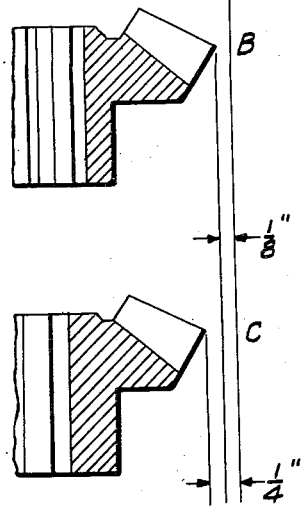
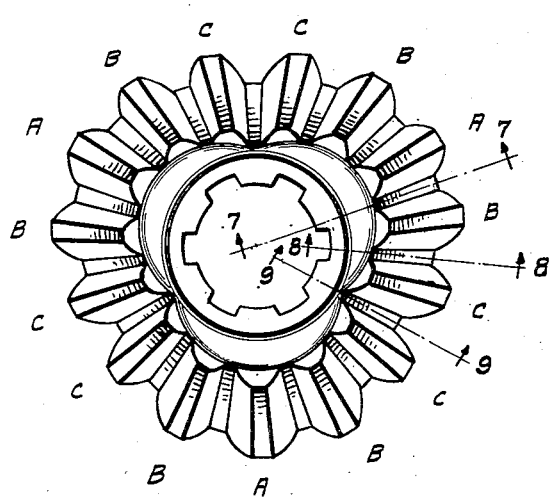
FIG. 6.
FIG. 9.
INVENTOR.
PETER PAUL GOBBERDIEL
BY
Harry H. Hitzeman
ATTORNEY.

March 25, 1958 P. P. GOBBERDIEL 2,827,803
DIFFERENTIAL GEARING
Filed Feb. 29, 1956 4 Sheets-Sheet 4

INVENTOR.
PETER PAUL GOBBERDIEL
BY
Harry H. Hitzeman
ATTORNEY.

United States Patent Office 2,827,803
Patented Mar. 25, 1958

2,827,803

DIFFERENTIAL GEARING

Peter Paul Gobberdiel, Lombard, Ill.

Application February 29, 1956, Serial No. 568,534

10 Claims. (Cl. 74—711)

My invention relates to improvements in differential gear sets, and more particularly to an automatic power dividing bevel gear differential for use in automotive vehicles.

The principal object of my invention is to provide an improved differential gear set so designed that as the side gears turn relative to each other, the torque ratio between the pinion and the side gears changes, so that the vehicle wheel which has good traction drives the vehicle instead of permitting the wheel which has no traction to spin, as when one driving wheel is on ice, mud or other slippery material, where with the usual differential the vehicle would not be moved.

Differential gear sets for attempting to accomplish these results have been made in the past, notably of the type shown in Scurlock Patents No. 2,067,952, issued January 19, 1937, and No. 2,692,515, issued October 26, 1954. In both of these gear sets, however, the pinion or spur gear is required by the construction of the same to be eccentrically mounted so as to swing from side to side and follow a uniformly zigzag path between the hill and dale faces of the side or driven gears which are keyed to a section of the driving axle of the automotive vehicle.

In said first mentioned patent the driving pinions have regularly spaced and shaped conventional involute teeth formed in the usual manner, and the side gears each have, on the toothed face thereof, two high points diametrically opposite to each other and two diametrically opposite low points whereby a hill and dale path is formed. The driving pinions are eccentrically mounted therebetween, each pinion meshing on one side with a high point on one side gear and a low point on the other.

The second above mentioned patent to Scurlock connects the aligned pinions with a guide shaft co-axial with the hubs of the same for additional support and to hold them against tilting. In addition, while this patent also uses pinions having uniformly spaced standard involute teeth especially shaped to mesh with the pinion teeth, the side gear teeth again have a sinuous hill and dale arrangement so that opposite teeth on the pinion mesh with opposed hill and dale tooth spacings on the side gears. This arrangement requires pinions to have an even number of teeth and the side gears to have an even number of teeth equal to two or more multiples of the pinion teeth.

One object of the present invention is the provision of a differential gear set of the type described in which the pinion will be in the nature of elliptical gears mounted on a shaft or axis medially disposed between the side gears.

A further object is to provide a differential gear set including slightly elliptically shaped pinions and side gears having a 1½ to 1 gear tooth ratio with intersecting arc-shaped pitch lines causing hills and dales for effecting a series of torque impulses sufficient to give traction to either vehicle wheel even though the other may be slipping with no traction.

A further object is to provide pinion and gear sets of the type described of such size and capacity that they are capable of substitution or replacement for passenger car differentials at present on the market.

A further object of the invention is to provide pinion and gear sets of the type described so designed that torque impulses may be obtained at every 120° of rotation of the side gear, and in which the gears and pinions run smoothly with each other at all times so that wear or binding is greatly reduced, providing a differential gear set which will give long and effective usage without becoming broken or out of order.

Other objects and advantages will be more apparent from the following description wherein reference is had to the accompanying drawings, upon which:

Fig. 2 is a front view of the specially designed pinion which I employ;

Fig. 3 is a side view thereof;

Fig. 4 is a diagrammatic view showing a series of sections adjacent the teeth A, B, and C, and illustrating how the elliptical gear effect is obtained by the construction of the pinion;

Fig. 5 is a side elevational view of one of the side gears;

Fig. 6 is a front view thereof;

Figure 11:
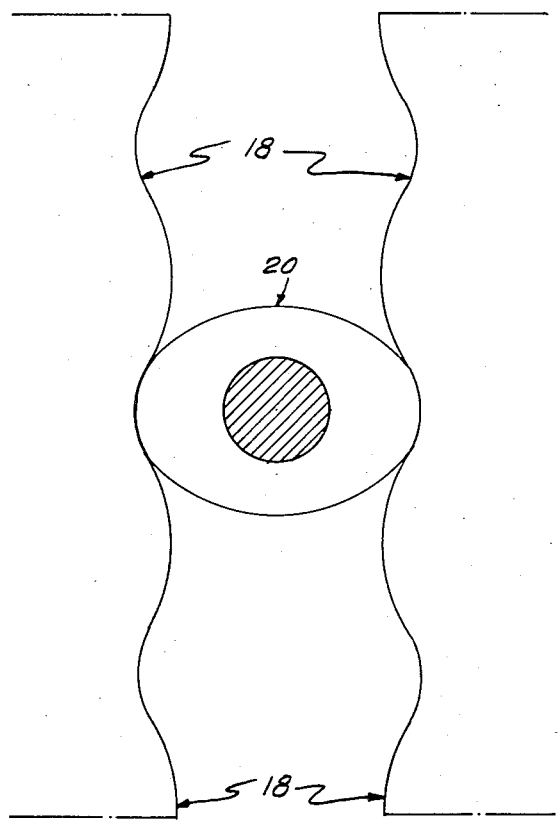
Figure 10:
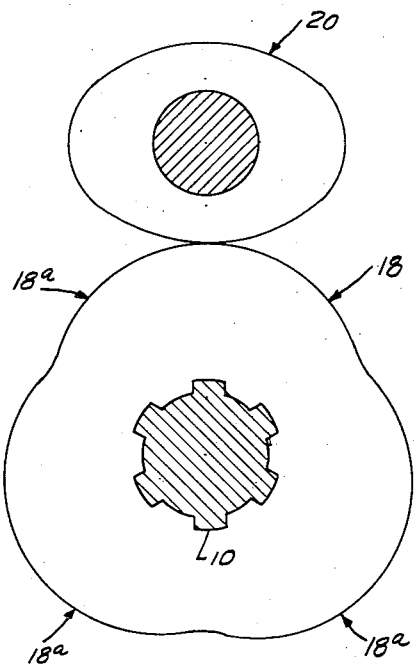

Figs. 7, 8 and 9 are fragmentary sectional views adjacent three of the teeth of the side gear, taken on the lines 7—7, 8—8, and 9—9 of Fig. 6;

Fig. 10 is a generally diagrammatic view showing the tangential pitch lines of the teeth of both the pinion and the side gears; and Fig. 11 is a diagrammatic developed view showing the pinion meshing with the side gear teeth in the different positions thereof.

Figure 1:
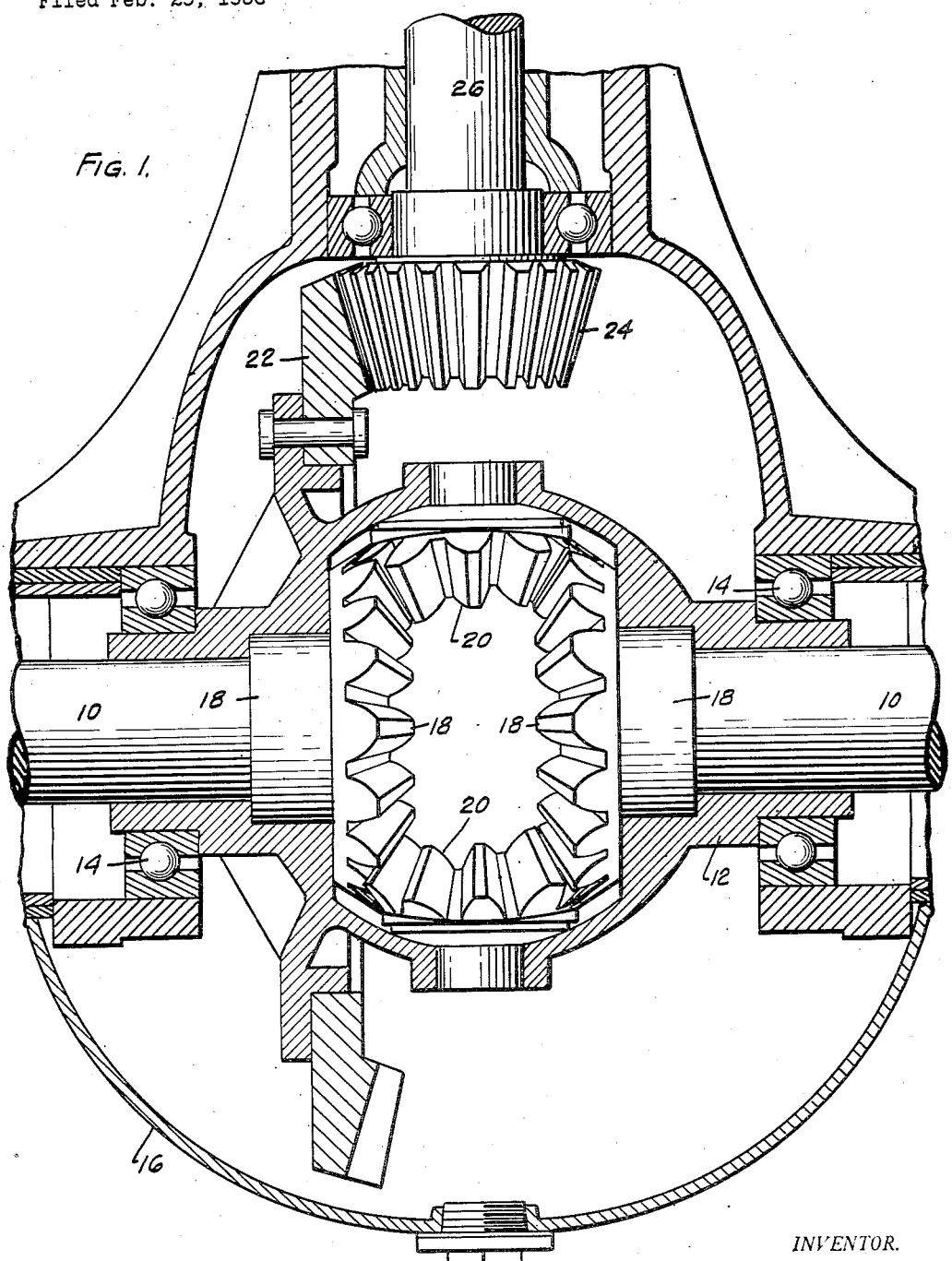
Fig. 1 is a plan sectional view through a differential housing showing generally the differential gearing embodying the principles of this invention.

In the embodiment of the invention which I have chosen to illustrate and describe the same, in Fig. 1 I have shown generally the two sections of the rear axle 10 supported in a rotary casing 12 that in turn is mounted for rotation on suitable ball bearing members 14 in the differential housing 16. The side gears 18 are mounted on the adjacent ends of the two sections of the axle and the pinion gears 20 are carried by the housing 12 which latter is fastened to the driving gear wheel 22. The gear wheel 22 is driven by the pinion 24 on the end of the usual propeller shaft 26 of the automotive vehicle. The pinions 20, as best shown in Figs. 2, 3 and 4, are specially designed and may consist of ten teeth which have been indicated by the letters A, B and C respectively.

In order to use an elliptically shaped drive pinion at right angles to the side gears, the teeth A are similar, the teeth B are similar, and the teeth C are similar. Thus as shown in Fig. 4, the teeth A extend inwardly from the inner edge of the hub one-half inch, the teeth B extend inwardly from the inner edge of the hub three-eighths inch, and the teeth C extend inwardly only one-fourth inch, providing the effect of a planetary elliptical gear as diagrammatically shown at 20 in Fig. 10.

The side gear 18, shown in Figs. 5 to 9 inclusive, is designed to a proportionate size so that it has fifteen teeth arranged five in a group in intersecting arc-shaped pitch lines 18a, the teeth designated A being at the extreme of the arc, the teeth designated B being intermediate, and the teeth designated C being innermost, so that there is in the gear illustrated a quarter-inch difference at their edges and a proportionate difference at the pitch lines of the same.

With this arrangement of pinion and gear, the same effect is created as in planetary or face gears as shown diametrically in Fig. 10, providing in effect on the side gears three hills and three dales, the same being diametrically opposed and so arranged with relation to the pinion 20 that the dale teeth on the pinion will be in driving relation with the hill teeth of the side gear, and as shown in the gears presented herein, a 1½ to 1 ratio between the driving pinion and the side gears.

With this construction the shaft of the pinions can be located axially thereof, thus providing a gear of far greater uniform strength than can be obtained where the hub is mounted concentric to the gear, and providing for far greater torque strength to any of the teeth of the pinion.

The side gears are also mounted on shafts located axially thereof and are thus evenly balanced and of uniform strength throughout so that the teeth on the same will effect uniform strength and torque at any point on the sinuous surface of the same, thus providing for longer wear and smoother operation throughout the life of the gear.

While I have illustrated and described a certain embodiment of the invention, it will be understood by those skilled in the art that changes and modifications may be had in the exact details shown, and I do not wish to be limited in any particular; rather what I desire to secure and protect by Letters Patent of the United States is:

1. A differential gear set comprising a pair of side gears mounted for rotation on a common axis and having their toothed faces in spaced relationship, the toothed faces of the side gears being sinuously curved to provide a hill and dale formation, a driving pinion mounted between the side gears and having uniformly spaced teeth meshing with the teeth on the side gears, said pinion mounted for rotation on a central axis, the pinion having toothed faces sinuously curved to mesh with the hill and dale formation of the teeth of the side gears.

2. A differential gear set comprising a pair of side gears mounted for rotation on a common axis and having their toothed faces in spaced relationship, the uniformly spaced toothed faces of the side gears being sinuously curved to provide a plurality of hill and dale formations, a pair of driving pinions mounted between the side gears and having uniformly spaced teeth meshing with the teeth on the side gears, said pinion mounted for rotation on a central axis, the pinion having toothed faces sinuously curved to mesh with the hill and dale formation of the teeth of the side gears.

3. A differential gear set comprising a pair of side gears mounted for rotation on a common axis and having their toothed faces in regularly spaced relationship, the regularly spaced toothed faces of the side gears being sinuously curved to provide a series of three hill and dale formations, a driving pinion mounted between the side gears, said pinion having regularly spaced teeth meshing with the teeth on the side gears, said pinion mounted for rotation on a central axis, the pinion having a toothed face sinuously curved to mesh with the hill and dale formation of the teeth of the side gear in driving relation.

4. A differential gear set comprising a pair of side gears mounted for rotation on a common axis and having their toothed faces in regularly spaced relationship, the regularly spaced toothed faces of the side gears being sinuously curved to provide a series of three hill and dale formations, a driving pinion mounted between the side gears, said pinion having regularly spaced teeth meshing with the teeth on the side gears, said pinion mounted for rotation on a central axis, the pinion having a toothed face sinuously curved to mesh with the hill and dale formation of the teeth of the side gear in driving relation, the sinuously curved toothed face of said pinion having a pair of oppositely opposed hills and dales.

5. A differential gear set comprising a pair of side gears mounted for rotation on a common axis and having their toothed faces in spaced relationship, the toothed faces of the side gears being sinuously curved to provide a hill and dale formation, a pair of driving pinions mounted between the side gears and having uniformly spaced teeth meshing with the teeth on the side gears, said pinions mounted for rotation on a common axis, each pinion having toothed faces sinuously curved to mesh with the hill and dale formation of the teeth of the side gears.

6. In a differential gear set comprising a pair of bevel side gears mounted for rotation on a common axis with their bevelled toothed faces in spaced facing relationship, the toothed faces of the side gears being sinuously curved to provide hill and dale formations, a pair of bevel pinions mounted on a common axis transverse to the axis of the side gears and meshing with the side gears, a gear casing extending around the side gears and the pinions, a hub on each of the pinions extending outward from the pinion and journalled in the gear casing, the pinions each having an even number of equally spaced teeth thereon and each side gear having one and one-half times as many teeth as each pinion, the toothed faces of the pinions also being sinuously curved to provide a hill and dale formation.

7. In a differential gear set comprising a pair of bevel side gears mounted for rotation on a common axis with their bevelled toothed faces in spaced facing relationship, the toothed faces of the side gears being sinuously curved to provide three hill and dale formations, a pair of bevel pinions mounted on a common axis transverse to the axis of the side gears and meshing with the side gears, a gear casing extending around the side gears and the pinions, a hub on each of the pinions extending outward from the pinion and journalled in the gear casing, the pinions each having an even number of equally spaced teeth thereon and each side gear having one and one-half times as many teeth as each pinion, the toothed faces of the pinions also being sinuously curved to provide a pair of hill and dale formations.

8. In a differential gear set comprising a pair of bevel side gears mounted for rotation on a common axis with their bevelled toothed faces in spaced facing relationship, the toothed faces of the side gears being sinuously curved to provide three hill and dale formations, a pair of bevel pinions mounted on a common axis transverse to the axis of the side gears and meshing with the side gears, a gear casing extending around the side gears and the pinions, a hub on each of the pinions extending outward from the pinion and journalled in the gear casing, the pinions each having an even number of equally spaced teeth thereon and each side gear having one and one-half times as many teeth as each pinion, the toothed faces of the pinions also being sinuously curved to provide a pair of hill and dale formations, the action of said pinions being the same as a regularly shaped elliptical gear drive.

9. A differential gear set comprising a pair of side gears mounted for rotation on a common axis and having their toothed faces in spaced relationship, the toothed faces of the side gears being sinuously curved to provide hill and dale formations, the teeth between the bottoms of the dales and the tops of the hills having their opposite sides of different depths with the sides of greater depth facing the dales, and driving pinions in mesh with said side gears, the toothed faces of the side gears being sinuously curved to provide hill and dale formations, the teeth between the bottoms of the dales and the tops of the hills having their opposite sides of different depths with the sides of greater depth facing the dales, the different depths of the hill formations on the toothed faces of the side gears being the same as the depths of the dale formations of the driving pinions.

10. In a differential gear set the combination of a pair of side gears mounted for rotation on a common axis, the toothed surface of said side gears being in the form of a plurality of intersecting arcs whereby a hill and dale formation is provided, and driving pinions therefor disposed on a common axis transverse to the axis of the side gears and meshing with said side gears, each of said pinion gears having a toothed formation in the form of a regular ellipse, the pitch line of said driving pinions adapted to coincide with the pitch line of said side gears.

References Cited in the file of this patent

UNITED STATES PATENTS

| | | |
|---|---|---|
| 1,528,762 | Goodhart | Mar. 10, 1925 |
| 2,065,661 | Davis | Dec. 26, 1936 |
| 2,067,952 | Scurlock | Jan. 19, 1937 |
| 2,283,661 | Williams | May 19, 1942 |
| 2,692,515 | Scurlock | Oct. 26, 1957 |